US011269802B2

(12) United States Patent
Mehta

(10) Patent No.: US 11,269,802 B2
(45) Date of Patent: Mar. 8, 2022

(54) LIGHTWEIGHT PROXY FOR HANDLING SCSI COMMANDS IN AN ACTIVE ARRAY-STANDBY ARRAY CONFIGURATION

(71) Applicant: Western Digital Technologies, Inc., San Jose, CA (US)

(72) Inventor: Vikash Mehta, Bangalore (IN)

(73) Assignee: Western Digital Technologies, Inc.

( * ) Notice: Subject to any disclaimer, the term of this patent is extended or adjusted under 35 U.S.C. 154(b) by 276 days.

(21) Appl. No.: 16/538,112

(22) Filed: Aug. 12, 2019

(65) Prior Publication Data

US 2020/0401546 A1 Dec. 24, 2020

Related U.S. Application Data

(60) Provisional application No. 62/865,735, filed on Jun. 24, 2019.

(51) Int. Cl.
*G06F 13/42* (2006.01)
*G06F 13/10* (2006.01)
*G06F 11/20* (2006.01)
*G06F 13/12* (2006.01)

(52) U.S. Cl.
CPC ...... *G06F 13/4221* (2013.01); *G06F 11/2038* (2013.01); *G06F 11/2048* (2013.01); *G06F 11/2069* (2013.01); *G06F 11/2074* (2013.01); *G06F 11/2097* (2013.01); *G06F 13/102* (2013.01); *G06F 13/124* (2013.01); *G06F 2213/0036* (2013.01)

(58) Field of Classification Search
None
See application file for complete search history.

(56) References Cited

U.S. PATENT DOCUMENTS

| | | | |
|---|---|---|---|
| 6,654,902 B1 | 11/2003 | Brunelle et al. | |
| 7,007,042 B2* | 2/2006 | Lubbers | G06F 11/2069 |
| 7,260,737 B1 | 8/2007 | Lent et al. | |
| 7,272,674 B1 | 9/2007 | Nandi et al. | |
| 7,318,138 B1* | 1/2008 | Usgaonkar | G06F 11/2092 711/163 |
| 7,340,639 B1 | 3/2008 | Lee et al. | |

(Continued)

FOREIGN PATENT DOCUMENTS

WO WO2002065290 A1 8/2002

OTHER PUBLICATIONS

'A Tutorial on SCSI-3 Persistent Group Reservations' (Version 1.1) by Lee Duncan, SUSE Labs, Dec. 2012. (Year: 2012).*

(Continued)

*Primary Examiner* — Steven G Snyder
(74) *Attorney, Agent, or Firm* — Patent Law Works LLP

(57) ABSTRACT

An apparatus, system, and method are disclosed that service SCSI commands, including SCSI PGR commands in the standby node of a storage system that operates in an Asymmetric Logic Unit Access (ALUA) mode. The apparatus, system, and method service SCSI PGR commands without maintaining peer/proxy port information. The apparatus, system, and method service SCSI commands by forwarding/proxying commands between the active node and standby node, in both directions and use a modified command descriptor block (MCDB) message to conduct the communications between the nodes.

20 Claims, 10 Drawing Sheets

(56) References Cited

U.S. PATENT DOCUMENTS

| | | | | |
|---|---|---|---|---|
| 7,730,274 | B1* | 6/2010 | Usgaonkar | G06F 11/2092 711/163 |
| 8,073,899 | B2 | 12/2011 | Grier et al. | |
| 8,495,325 | B2* | 7/2013 | Yamamoto | G06F 3/0617 711/165 |
| 8,626,967 | B1 | 1/2014 | Naik et al. | |
| 8,762,663 | B2* | 6/2014 | Broido | G06F 3/0647 711/161 |
| 8,782,358 | B2* | 7/2014 | Broido | G06F 3/0607 711/161 |
| 8,977,888 | B1 | 3/2015 | Bafna | |
| 9,021,232 | B2* | 4/2015 | Kopylovitz | G06F 3/067 711/209 |
| 9,274,989 | B2 | 3/2016 | Li-On et al. | |
| 9,348,713 | B2* | 5/2016 | Kalman | G06F 3/0619 |
| 9,703,649 | B2* | 7/2017 | Winokur | G06F 11/2069 |
| 9,830,088 | B2* | 11/2017 | Chandrashekar | G06F 11/16 |
| 10,175,895 | B2* | 1/2019 | Kalman | G06F 3/067 |
| 10,423,332 | B2* | 9/2019 | Bali | G06F 3/0619 |
| 10,969,985 | B1* | 4/2021 | Matsugami | G06F 3/0607 |
| 10,996,864 | B1* | 5/2021 | George | G06F 3/0619 |
| 2007/0260840 | A1* | 11/2007 | Watanabe | G06F 3/0665 711/165 |
| 2007/0294564 | A1 | 12/2007 | Reddin et al. | |
| 2008/0133852 | A1 | 6/2008 | Grier et al. | |
| 2012/0278280 | A1* | 11/2012 | Broido | G06F 3/0647 707/610 |
| 2012/0278568 | A1* | 11/2012 | Broido | G06F 3/0647 711/162 |
| 2013/0007410 | A1 | 1/2013 | Kopylovitz et al. | |
| 2013/0024639 | A1* | 1/2013 | Yamamoto | G06F 3/0635 711/165 |
| 2015/0169411 | A1* | 6/2015 | Kalman | G06F 11/20 714/4.12 |
| 2016/0006810 | A1* | 1/2016 | Chiba | G06F 3/0689 709/219 |
| 2016/0077996 | A1* | 3/2016 | Bali | G06F 11/2092 710/306 |
| 2016/0085460 | A1* | 3/2016 | Chandrashekar | G06F 3/0617 711/130 |
| 2016/0179637 | A1* | 6/2016 | Winokur | G06F 11/2005 714/5.1 |
| 2016/0266830 | A1* | 9/2016 | Kalman | G06F 11/2069 |
| 2021/0124515 | A1* | 4/2021 | Subbiah | G06F 3/0635 |
| 2021/0126862 | A1* | 4/2021 | Subbiah | H04L 43/02 |

OTHER PUBLICATIONS

'ALUA' by Pearson IT Certification, Oct. 5, 2017. (Year: 2017).*
'SCSI Commands Reference Manual' by Seagate, Oct. 2016. (Year: 2016).*
'Asymmetric SCSI behavior' email from Sun, Mar. 21, 2001. (Year: 2001).*
'XCOPY and ODXin ddpt utility' Dec. 27, 2014. (Year: 2014).*
POT/IB2020/052174 International Search Report dated Jun. 5, 2020.
PCT/IB2020/052174 Written Opinion.
Joe Breher, Information Technology—T10 SCSI Command Standard, SCSI Primary Commands-5(SPEC-5), Project T10/BSR INCITS 502, pp. 136-161, Revision 22 Apr. 19, 2019.
How to non-disruptively change between Active-Passive and ALUA failover modes on NetApp E-Series arrays connected to clustered Data ONTAP systems, Nov. 17, 2018.
Description of SCSI3-Persistent Group Reservations (PGR) Functionality, Jan. 10, 2009.
What are SCSI Reservations and SCSI Persistent Reservations?, Feb. 14, 2018.

* cited by examiner

MIGRATION STATUS

LOGICAL ADDRESS MIGRATION TABLE 502

| LBA# | SOURCE | DESTINATION |
|------|--------|-------------|
| LBA0 | 0 | 1 |
| LBA1 | 1 | 0 |
| LBA2 | | |
| ⋮ | | |
| LBAn | | |

FIG. 5

|  | BIT 7 | BIT 6 | BIT 5 | BIT 4 | BIT 3 | BIT 2 | BIT 1 | BIT 0 |
|---|---|---|---|---|---|---|---|---|
| BYTE 0 | OPERATION CODE 802 (28h) ||||||||
| BYTE 1 | RESERVED ||| DPO | FUA | RESERVED || RELADR |
| BYTE 2 | (MSB) LOGICAL BLOCK ADDRESS 804 (00) ||||||||
| BYTE 3 | 00 ||||||||
| BYTE 4 | 01 ||||||||
| BYTE 5 | 00 (LSB) ||||||||
| BYTE 6 | RESERVED ||||||||
| BYTE 7 | (MSB) TRANSFER LENGTH 806 (00) ||||||||
| BYTE 8 | 01 (LSB) ||||||||
| BYTE 9 | CONTROL BYTE ||||||||

FIG. 8

| | BIT 7 | BIT 6 | BIT 5 | BIT 4 | BIT 3 | BIT 2 | BIT 1 | BIT 0 |
|---|---|---|---|---|---|---|---|---|
| BYTE 0 | VENDOR DEFINED OPERATION CODE 902 (xxh) | | | | | | | |
| BYTE 1 | RESERVED | | | DPO | FUA | RESERVED | | RELADR |
| BYTE 2 | (MSB) LOGICAL BLOCK ADDRESS 904 | | | | | | | 00 |
| BYTE 3 | | | | | | | | 00 |
| BYTE 4 | | | | | | | | 01 |
| BYTE 5 | | | | | | | | 00 (LSB) |
| BYTE 6 | RESERVED | | | | | | | |
| BYTE 7 | (MSB) TRANSFER LENGTH 906 | | | | | | | 00 |
| BYTE 8 | | | | | | | | 01 (LSB) |
| BYTE 9 | CONTROL BYTE | | | | | | | |

FIG. 9

LIGHTWEIGHT PROXY FOR HANDLING SCSI COMMANDS IN AN ACTIVE ARRAY-STANDBY ARRAY CONFIGURATION

CROSS-REFERENCE TO RELATED APPLICATIONS

This application claims priority to U.S. Provisional Patent Application Ser. No. 62/865,735, filed Jun. 24, 2019, the entirety of which is incorporated by reference.

BACKGROUND

The process of handling Small Computer System Interface (SCSI) commands across an array of storage devices presents technical challenges when the storage array includes both an active path and a standby path (also called a passive path) to controllers dedicated to these paths inside the array and SCSI commands to the standby path are proxied to the active controller for handling.

A number of components comprise the current standard implementation of SCSI command handling. A host cluster within a private network comprises one or more nodes. A disk shared across nodes are referred to as a shared disk; a node owning a shared disk is referred to as a master node, while other nodes are referred to as slave nodes. Exclusive access of a shared disk by a node in SCSI is achieved using SCSI-3/persistent group reservation (PGR) reservations. The active/standby storage array is configured as such using Asymmetric Logic Unit Access (ALUA) and include configurations of an active controller and a standby controller. An active path comprises the path to the active controller and is the preferred path for input/output means; similarly a standby path comprises the path to the standby controller and is the non-preferred path for input/output. A SCSI command to the active node is handled locally while a SCSI command to the standby path gets proxied to the active controller for handling. In case of failure of the active controller, the standby controller assumes the functions of the active controller.

A number of methods also comprise the current standard implementation of SCSI command handling. As to SCSI command handling, a host prefers the active path for input/output communication, but commands like persistent group reservation (PGR) are sent on active paths and standby paths. SCSI commands for an active node are handled locally whereas commands for a standby node are proxied to an active node for handling. In the case of Asymmetric Logic Unit Access (ALUA), a few SCSI commands, per the SCSI specification are required to be handled on a standby node. As for usage of a SCSI-3/persistent group reservation (PGR) command in a host cluster, a node acquires exclusive disk access using a SCSI-3/persistent group reservation (PGR) reservation; the reservation requires persistent group reservation (PGR) key registration and reservation. Each node generates a unique key for SCSI-3 registrations and reservations. After key registration, the key can use SCSI-3 commands on active paths and standby paths. Once registered, a node acquires exclusive disk access by reserving it using a SCSI-3 reservation command; once reserved, disk access for a non-reserved node is restricted based on the type of SCSI-3 reservation.

With a disk reserved by a host, to ensure exclusive access every SCSI command to disk undergoes a reservation conflict validation before processing. Reservations are on a per-path basis; each reservation is uniquely identified by host reservation key, remote port identifier, and target port identifier. These parameters (host reservation key, remote port identifier, target port identifier) are saved for each registration/reservation. Reservation information/persistent group reservation (PGR) is stored persistently; in an Active-Standby configuration, only an active node has access to the PGR persistent group reservation (PGR) database. Furthermore, there is only one copy of the PGR database, which is maintained by the active node. As noted above, a SCSI command to an active node and/or active path is handled locally; a SCSI command to a standby node and/or standby path is handled as follows: proxy representations of a peer port are registered locally; proxy representations of an active port are registered locally in standby node and vice-versa; proxy port status is monitored and maintained to be synchronized with the peer local port. A SCSI command on a standby port is proxied to an active node for handling. For an active node, proxy commands are validated for reservation conflict using the proxy port.

In such an active/standby configuration of controllers and their accompanying paths, the requirement of maintaining and monitoring a proxy representation of a local port is a complex approach in terms of session management. Handling of PGR SCSI commands is challenging without maintaining proxy representation of local ports. Conventional solutions do not support PGR SCSI commands in an active/standby configuration without the proxy representation of local ports.

Where Asymmetric Logic Unit Access (ALUA) is maintained across an active/standby array configuration, this approach is also not scalable for features like seamless data migration or live data migration. The sequence of command handling as described above (i.e., when a SCSI command is sent from a host to a standby controller) is cumbersome and ineffective for data migration, particularly in a time-sensitive environment (e.g., live data usage).

A need exists, for a means to manage both initiator and local port information while proxying a SCSI command to a peer node without maintaining a proxy port. Additionally, a need exists to resolve a reservation conflict for a proxy command arrived on a standby path without having standby port information in the active node as a proxy.

BRIEF SUMMARY

In order to address the problems and challenges noted above, a method and system for handling SCSI commands in an Active-Standby Array via a lightweight proxy is disclosed.

According to a first aspect, the disclosure includes an apparatus comprising: an active controller configured to operate in an Asymmetric Logic Unit Access (ALUA) mode and configured to service Persistent Group Reservation (PGR) Small Computer system Interface (SCSI) commands over an optimized access (OA) path to a host, the active controller having two or more ports; a standby controller configured to operate in an ALUA mode and configured to service SCSI PGR commands over a non-optimized access (NOA) path to the host, the standby controller having the two or more ports; and a communication channel between the active controller and the standby controller, the communication channel configured to communicatively couple the active controller and the standby controller such that the standby controller services the SCSI PGR commands over a NOA path.

According to another aspect, the disclosure includes a system comprising: a source node configured to service SCSI commands from a host, the source node coupled to a first storage device that includes a logical partition; a destination node coupled to a second storage device, the destination node configured to service the SCSI commands from the host; a communication channel between the source node and the destination node; and a migrator configured to migrate the logical partition from the source node to the destination node such that the host maintains storage operations with both the source node and the destination node during migration of the logical partition.

According to another aspect, the disclosure includes a method comprising: receiving a Persistent Group Reservation (PGR) Small Computer system Interface (SCSI) command over a non-optimized access (NOA) path at a standby controller, a SCSI PGR command sent by a host and the standby controller operating in an Asymmetric Logic Unit Access (ALUA) mode; sending a command descriptor block (CDB) message that requests PGR reservation data to an active controller operating in an ALUA mode, the active controller in communication with the standby controller over a SCSI communication channel; receiving a CDB message from the active controller comprising the PGR reservation data over the SCSI communication channel; determining whether the host has permission to use a NOA path for SCSI commands; and servicing the SCSI commands received on the NOA path from the host, in response to the PGR reservation data confirming that the host has permission to use the NOA path.

According to yet another aspect, the disclosure includes a method comprising: directing a source node to operate in an Asymmetric Logic Unit Access (ALUA) mode as an active node, in response to a request to perform a live data migration operation, the source node comprising a first storage device having a logical partition designated as a source the logical partition for the live data migration operation. In one embodiment, the logical partition includes a portion of the logical partition accessible exclusively to the source node and a portion of the logical partition accessible exclusively to the destination node.

The method also comprises directing the source node to service storage commands targeted for the logical partition during the live data migration operation, the storage commands received at the source node, based on where data referenced by a storage command resides during the live data migration operation; directing a destination node to operate in ALUA mode as a standby node during the live data migration operation, the destination node comprising a second storage device configured to receive a copy of the logical partition; directing the destination node to service the storage commands targeted for the logical partition during the live data migration operation, the storage commands received at the destination node, based on where data referenced by the storage command resides during the live data migration operation; directing a migrator to initiate the live data migration operation and move data of the logical partition from the first storage device to the second storage device; and in response to completing migration of data of the logical partition to the second storage device, directing the active node to operate in the ALUA mode as the standby node and directing the standby node to operate in the ALUA mode as the active node.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 5 illustrates a migration status module 500 in accordance with one embodiment.

FIG. 8 illustrates a command descriptor block 800 in accordance with one embodiment.

FIG. 9 illustrates a modified command descriptor block (MCDB) message 900 in accordance with one embodiment.

DETAILED DESCRIPTION

Figure 1:
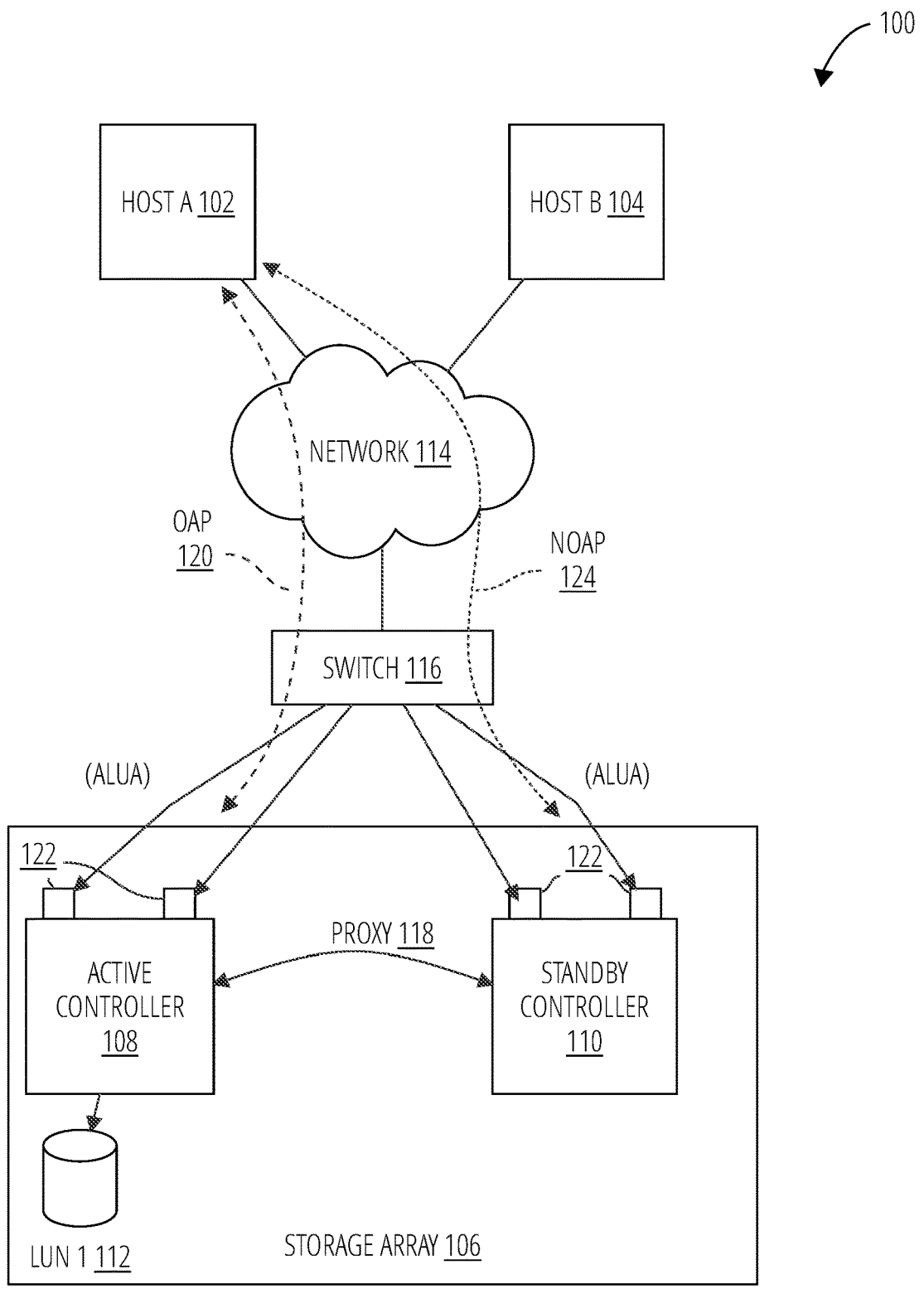
FIG. 1 illustrates a storage system 100 in accordance with one embodiment.

"Access path" refers to a connection, typically from a node to a host, characterized as either an optimized access (OA) path or non-optimized access (NOA) path.

"Active command handler" refers to a command processing unit of an active controller configured to selectively service SCSI commands at the active controller locally and proxy the SCSI commands to the standby controller to engage the assistance of the standby controller based on where data associated with a SCSI command resides during a live data migration operation.

"Active controller" refers to a storage controller configured to service storage commands over an optimized access (OA) path such that the host receives the response at an optimized performance level. In certain embodiments, the active controller operates in concert with a standby controller that services the storage commands over a non-optimized access (NOA) path and so the response performance from the standby controller is less than if the active controller had serviced the storage command.

"Active node" refers to an element of a host cluster connected to an active controller of a storage array via an optimized access (OA) path.

"ALUA mode" refers to an abbreviation for "Asymmetric Logic Unit Access (ALUA) mode".

"Asymmetric Logic Unit Access (ALUA) mode" refers to a set of SCSI concepts and commands that define roles for two nodes (Active-Active or Active-Standby). The ALUA mode designates the roles based on path prioritization for the nodes, the SCSI devices.

"CDB message" refers to an abbreviation for "command descriptor block (CDB) message".

"Command descriptor block (CDB) message" refers to a format in which SCSI commands are sent for transferring data between computers and peripheral devices, often computer storage.

"Communication channel" refers to a means of data transfer between an active controller and a standby controller, configured to communicatively couple the active controller and the standby controller such that the standby controller services the SCSI PGR commands over a NOA path.

"Completion phase" refers to a successful migration of the logical partition from the source node to the destination node.

"Data block" refers to a sequence of bytes or bits, usually containing some whole number of records, having a maximum length, a block size.

"Destination node" refers to a node coupled to a second storage device configured to service SCSI commands from the host.

"Host" refers to a cluster of one or more nodes, both active and standby.

"Initiator port identifier" refers to a means of SCSI port identification for a data storage initiator device.

"LBA" refers to an abbreviation for a "logical block address".

"Live data migration operation" refers to an operation in which data from a source node is copied to a destination node, while both the source node and the destination node continue to service storage requests from hosts.

"Local port identifier" refers to a means of SCSI port identification for a local (e.g., not networked) data storage device.

"Logical block address" refers to a numerical indicator for specifying the location of blocks of data stored on computer storage devices, generally secondary storage systems such as hard disk drives.

"Logical partition" refers to a subset of a computer's hardware resources, virtualized as a separate computer, typically referring to a partition of a data storage device.

"Logical target partition" refers to a subset of a computer's hardware resources, referring to a partition of a target data storage device and coupled to a destination node.

"LUN" refers to a logical unit number, a number used to identify a logical unit, which is a device addressed by the SCSI protocol.

"MCDB message" refers to an abbreviation for a "modified command descriptor block (MCDB) message".

"Modified command descriptor block (MCDB) message" refers to a modified CDB message, proxied to the active controller, by a SCSI command handler configured to service the SCSI commands received from the host.

"Namespace" refers to a contiguously-addressed range of Non-Volatile Memory conceptually similar to a hard disk partition or SCSI Logical Unit (LUN).

"Namespace identifier" refers to a means of identifying a namespace, a contiguously-addressed range of Non-Volatile Memory conceptually similar to a hard disk partition or SCSI Logical Unit (LUN).

"NOA path" refers to an abbreviation for a "non-optimized access (NOA) path".

"Non-optimized access (NOA) path" refers to a connection over which a standby controller is configured to service SCSI commands to the host.

"NSID" refers to an abbreviation for a "namespace identifier".

"OA path" refers to an abbreviation for an "optimized access (OA) path".

"Opcode" refers to a one byte operation code sent at the start of a SCSI command sent in a CDB message followed by five or more bytes containing command-specific parameters.

"Optimized access (OA) path" refers to a preferred connection between a host and an active controller having two or more ports.

"Partition identifier" refers to a byte value intended to specify the file system the partition contains and/or to flag special access methods used to access these partitions, typically comprised of a LUN or NSID for logical partitions under SCSI.

"PGR reservation data" refers to an I_T_L nexus, i.e., an initiator port identifier (also called a remote port identifier, target port identifier and a partition identifier, such as a Logical Unit Number (LUN).

"Remote port identifier" refers to a means of identifying a non-local port within PGR reservation data.

"SCSI command" refers to a computer control instruction passed between a node and a controller on a shared disk storage array.

"SCSI command handler" refers to a software handler configured to service SCSI commands within an active controller or standby controller.

"SCSI PGR command" refers to a means of reserving a SCSI storage device for one or more cooperating computers, characterized by PROUT commands, i.e., reservation or registration commands being sent from the initiator to the target, and PRIN commands, i.e., the initiator querying the target about reservations or registrations.

"SCSI PGR command handler" refers to a command handler configured to validate the SCSI PGR commands.

"Source node" refers to a node configured to service SCSI commands from a host and coupled to a storage device that includes a logical partition.

"Standby command handler" refers to a handler on a standby controller comprising a SCSI PGR command handler configured to validate the SCSI PGR commands.

"Standby controller" refers to a standby controller is a storage controller configured to service storage commands both while an active controller is functioning properly and when the active controller is unavailable to a host. In certain embodiments, the standby controller services the storage commands over a non-optimized access (NOA) path and so the response performance is less than if the active controller had serviced the storage command.

"Standby node" refers to an element of a host cluster connected to a standby controller of a storage array via a non-optimized access (NOA) path.

"Storage command" refers to a SCSI command received at the source node, based on where data referenced by it resides during the live data migration operation.

"Storage controller" refers to an active controller or standby controller configured to service storage commands over an access path.

"Storage device" refers to a means of storing computer data, coupled to a source node or destination node, and includes a logical partition.

"Target port identifier" refers to a means of identifying one or more SCSI ports on a storage device for receiving data.

"Transition phase" refers to a data migration period comprising movement of the logical partition to the destination node and direction of the destination node to operate as a standby node.

"Two or more ports" refers to an enumeration of the number of SCSI ports on either an active controller or a standby controller.

"Vendor defined opcode" refers to an opcode that a communication standard such as SCSI provides as part of the standard. Manufacturers of storage devices compliant with the SCSI standard can use the vendor defined opcodes to implement particular parts of the standard.

The disclosure is for a lightweight solution for handling small computer system Interface (SCSI) commands in a storage configuration of an active node/standby node storage configuration, within a storage device, within a storage array, or within a storage system. Some challenges this disclosure addresses include: no need to maintain proxy port information including initiator and/or remote port information while servicing or proxying a SCSI commands to a peer node. This solution addresses how to validate a Persistent Group Reservation (PGR) reservation, at the standby node, for a command arriving over a non-optimized access (NOA) path to a standby node without having port information maintained across both the active node and the standby node.

The storage system 100 comprises a host A 102, a host B 104, a storage array 106, an active controller 108, a standby controller 110, a LUN 1 112, a network 114, a switch 116, a proxy communication channel 118, an OA path 120, a communication ports 122, and a NOA path 124.

In the industry, a logical partition is referred to as a logical unit number (LUN) (with a LUN as the partition identifier) or as a namespace (with a namespace identifier (NSID) as the partition identifier). Both logical unit number (LUN) and namespace can be used interchangeably herein. Both LUN and namespace identifier can be used interchangeably herein. A namespace may also be interchangeably referred to as a logical partition or logical unit number (LUN). In one embodiment, a namespace is a range of contiguous and monotonically increasing logical block addresses. Each namespace of a plurality of namespaces comprises a set of logical block addresses (LBA).

In one embodiment, data blocks may represent the smallest amount of data associated with a given logical address. Data blocks may be further divided into sectors. As one example, a sector may be 512 bytes and a data block may include 8 sectors and therefore be 4 KB. Data blocks are quantities of space allocated for and storing data on physical storage media. The LBAs represent the data blocks in the logical partition.

FIG. 1. illustrates host A 102 and host B 104 communicating over network 114 to conduct storage operations on storage array 106. The storage array 106 connects to the network 114 through switch 116. The storage array 106 is configured to include two controllers; active controller 108 and standby controller 110. Active controller 108 communicates with standby controller 110 by using proxy communication channel 118. The storage array 106 and active controller 108 and standby controller 110 are configured in in Asymmetric Logic Unit Access (ALUA) configuration (also referred to herein as an ALUA mode). In an ALUA configuration, the storage array 106 provides two independent paths for data storage operations to host A 102 and/or host B 106. A first storage path is an optimized access (OA) path (OA path 120). The OA path 120 is a path configured for optimal speed, availability, and performance in servicing storage commands from the host A 102 to the storage array 106. The second path is a non-optimized access (NOA) path (NOA path 124). The NOA path 124 provides an access path to the host A 102 to serve as an alternative path to storage devices mounted or connected to active controller 108. The NOA path 124 may not be optimized for speed, reliability, or bandwidth; however the NOA path 124 is a useable path for the host A 102 to use as it desires.

Each controller (108, 110) includes two or more ports 122. These ports are communication ports 122 and provide redundant access paths for the host A 102 to reach a logical partition, such as LUN 1 112. In FIG. 1, the ports of the active controller 108 are included in the OA path 120. The ports of the standby controller 110 are included in the NOA path 124.

In certain embodiments, the active controller 108 and standby controller 110 are configured to support SCSI PGR commands even though there is no central proxy port configuration data store. Conventional systems include a configuration database or other data store for tracking Logical Unit Number (LUN) mappings, inquiry data, port state information, as well as LUN masking and mapping information, and other configuration information. These systems include added logic to manage the configuration data and keep it current for all users (hosts, initiators, targets, or the like) on a storage network.

Reservation commands were introduced to the SCSI protocol with SCSI-2. Later SCSI-3 introduced Persistent Group Reservation (PGR) commands permitting the reservations to remain in place after power is removed, i.e., PGR reservations are persistent in SCSI-3. Herein, PGR commands and SCSI PGR commands refer to SCSI-3 PGR commands. Examples of PGR commands include PGR-in and PGR-out. PGR-in (e.g., PRIN) commands are commands sent from an initiator (e.g., a host) to a target (e.g., storage device/array/node). PGR-in commands are also referred to as read commands. PGR-out (e.g., PROUT) commands are typically commands for which data is being sent from an initiator to the target for writing PGR reservation data. PGR-out commands are also referred to as write commands. Or course, certain PGR-in commands may also send data from the Target to the Initiator. SCSI PGR commands are a subset of SCSI commands that are designed for managing a SCSI reservation of an access path between the host and a storage resource such as a LUN, controller, node, or other target.

FIG. 1 also illustrates an active controller 108 configured to operate in an Asymmetric Logic Unit Access (ALUA) mode and configured to service Persistent Group Reservation (PGR) Small Computer system Interface (SCSI) commands over an optimized access (OA) path 120 to a host, the active controller 108 includes two or more ports. A standby controller 110 is configured to operate in ALUA mode and to service SCSI PGR commands over a non-optimized access (NOA) path to the host, the standby controller 110 includes two or more ports. A proxy communication channel 118 serves as a communication channel between the active controller 108 and the standby controller 110. The communication channel is configured to communicatively couple the active controller 108 and the standby controller 110 such that the standby controller 110 services SCSI PGR commands over the NOA path 124.

The SCSI standard requires the standby controller 110 to service certain SCSI commands including SCSI PGR commands. The SCSI PGR commands include functions such as doing PGR validation of PGR reservations before servicing SCSI commands over a particular path (e.g., 124). PGR validation is where a storage node determines whether the host sending the command has proper permissions to use the path and access the target LUN.

In conventional systems, the standby controller 110 would proxy a SCSI PGR command to the active controller 108 to have the access path validated and to have the SCSI PGR command serviced. In the embodiments disclosed herein, the standby controller 110 is configured to cooperate with the active controller 108 such that the standby controller 110 performs PGR validation of SCSI commands received over NOA path 124 from host A 102 locally, without proxying the SCSI command to the active controller 108 to have the active controller 108 perform the PGR validation.

In the disclosed embodiments, the active controller 108 is configured to proxy SCSI commands to the standby controller 110 by way of the proxy communication channel 118 in response to the active controller 108 and standby controller 110 engaging in a live data migration operation. A live data migration operation is a feature, function, or capability of a storage system (e.g., storage device, storage array, set of storage arrays, a storage network, or the like). In certain embodiments, a live data migration operation is an operation that enables a host to have, obtain, and/or maintain constant storage access to one or more LUNs of a source node and one or more LUNs of a destination node while data for one of the LUNs accessible to the host migrates from the source node to the destination node. Conventional storage systems interrupt access between a host and one or more of its LUN in order to do a migration to a destination node. In some cases, the interruption is short while in others it is long. The disclosed solution enables a live data migration operation without interrupting or disturbing any of the connected hosts and performing storage operations using the source node (e.g., active controller 108) or destination node (e.g., standby controller 110).

As used herein, servicing of a command means receiving the command from a host and performing all necessary actions to fulfill the command, including validating or authenticating that the host has permission to receive a valid response for the command, retrieving data required for validation or authentication, retrieving of data to fulfill the command, writing of data to fulfill the command, and returning data, an acknowledgement, or other result to the host that issued the command. Depending on the embodiment and implementation, servicing of a command may include performing actions locally on the node, device, or controller that received the command and/or proxying the command to another node, device, or controller to have one or more actions performed as part of the servicing. Examples of commands that may be serviced by one or more components, modules, or actors in this disclosure include servicing of SCSI commands, servicing of SCSI PGR commands, servicing of storage commands, and the like. As used herein, proxying a command or to proxy means that one node, device, or controller, sends detailed information about a command to another node, device, or controller, without relinquishing responsibility for fulfilling the command. Said another way, proxying a command means that one node is enlisting the assistance of another node in the storage system in servicing the command. Once the other node does its part, the results are provided back to the original node that proxied the command and that original node sends the results back to the host.

In one embodiment, the active controller 108 includes an active command handler configured to selectively service SCSI commands at the active controller 108 and proxy SCSI commands to the standby controller 110 to engage assistance of the standby controller based on where data associated with the SCSI command resides during a live data migration operation. This selective servicing or engagement of the standby controller for servicing of SCSI commands by the active controller 108 is useful during a live data migration operation because during the live data migration operation data of a LUN is in transition between the source node (e.g., active controller 108) and destination node (e.g., standby controller 110). The active command handler is configured to determine where the data blocks having associated logical block addresses (LBA)s of a received SCSI command are in the live data migration operation process and, based on the location of the LBAs, either service the SCSI command locally on the active controller 108 or proxy the SCSI command over proxy communication channel 118 to the standby controller 110.

In one embodiment, the standby controller 110 includes a standby command handler that includes a SCSI PGR command handler and a SCSI command handler. In one embodiment, the standby command handler is configured to service substantially all SCSI commands (both SCSI PGR commands and other SCSI commands) locally within the standby controller 110. Servicing the command locally means that a response to the command, either data or an acknowledgment or an error message, is sent from the standby controller 110. While the standby controller 110 may communicate with the active controller 108 to fulfill the command, such action is still considered a servicing of the SCSI command locally at the standby controller 110.

In another embodiment, the standby command handler is configured to service certain SCSI commands either locally within the standby controller or by way of communicating, or proxying, the SCSI command to the active controller depending on where data associated with the SCSI command resides during a live data migration operation. In certain embodiments, when standby controller 110 proxies a SCSI command to the active controller 108, such proxying or communicating is still considered servicing the SCSI command locally at the standby controller 110 because the standby controller 110 returns a response to the host, not the active controller 108.

The ability to service a SCSI command based on where the data resides (active controller 108 or standby controller 110) is advantageous because during a live data migration operation two copies of data may exist (one on the source node, e.g., active controller 108, and one on the destination node, e.g., standby controller 110). The standby command handler determines which node performs the storage action (read or write or unmap) of the SCSI command based on where the most current version of the relevant data resides (active node/standby node).

The SCSI PGR command handler is configured to validate (or authenticate) SCSI PGR commands. In one embodiment, the SCSI PGR command handler is also configured to service SCSI PGR commands if the host has provided the proper credentials for a successful validation. In certain embodiments, servicing a SCSI PGR command may involve the SCSI PGR command handler accessing PGR reservation data from the active controller 108 and sending a response to the host based on data in the PGR reservation data. In other embodiments, servicing a SCSI PGR command may involve the SCSI PGR command handler communicating with the active controller 108 to access, and/or modify PGR reservation data that resides with the active controller 108.

As used herein, a SCSI PGR command includes, but is not limited to, a command designed to read, write, modify, update, or determine information about PGR reservations for access paths between the active node and hosts connected to the active node (e.g., active controller 108). SCSI PGR commands are uniquely identified based on byte 0 and byte 1 of command descriptor block (CDB). CDB byte 0 is used to identify PGR-IN (reading PGR key and reservations) or PGR-OUT (writing PGR key and reservation). CDB byte 1 is used to identify PGR-Action (Register, Reserve, Release, and so on).

Examples of commands that are SCSI PGR commands, include but are not limited to: For SCSI PGR IN commands, READ KEYS, READ RESERVATIONS, REPORT CAPABILITIES, and READ FULL STATUS; for SCSI PGR OUT commands, REGISTER, REGISTER AND IGNORE EXISTING KEY, RELEASE, RESERVE, PREEMPT, PREEMPT AND ABORT, CLEAR, and REGISTER AND MOVE.

The SCSI command handler of the standby command handler is configured to selectively service SCSI commands locally within the standby controller or with the assistance of the active controller based on where data associated with the SCSI command resides during a live data migration operation.

In one embodiment, the SCSI command handler of the standby controller 110 is configured to service all SCSI commands (both SCSI PGR commands and other SCSI commands) locally within the standby controller. In another embodiment, the SCSI command handler of the standby command handler is configured to service certain SCSI commands locally within the standby controller and enlist the active controller to service other SCSI commands.

This selective servicing and enlisting of the active controller by the standby controller 110 is useful during a live data migration operation because during the live data migration operation data of a LUN is in transition between the source node (e.g., active controller 108) or destination node (e.g., standby controller 110). The standby command handler is advantageously configured to determine where the data blocks having associated logical block addresses (LBAs) of a received SCSI command are in the live data migration operation process and, based on the location of the LBAs, either service the SCSI command locally on the active controller 108 or enlist the help of the active controller by way of the proxy communication channel 118 to the active controller 108.

Figure 2:
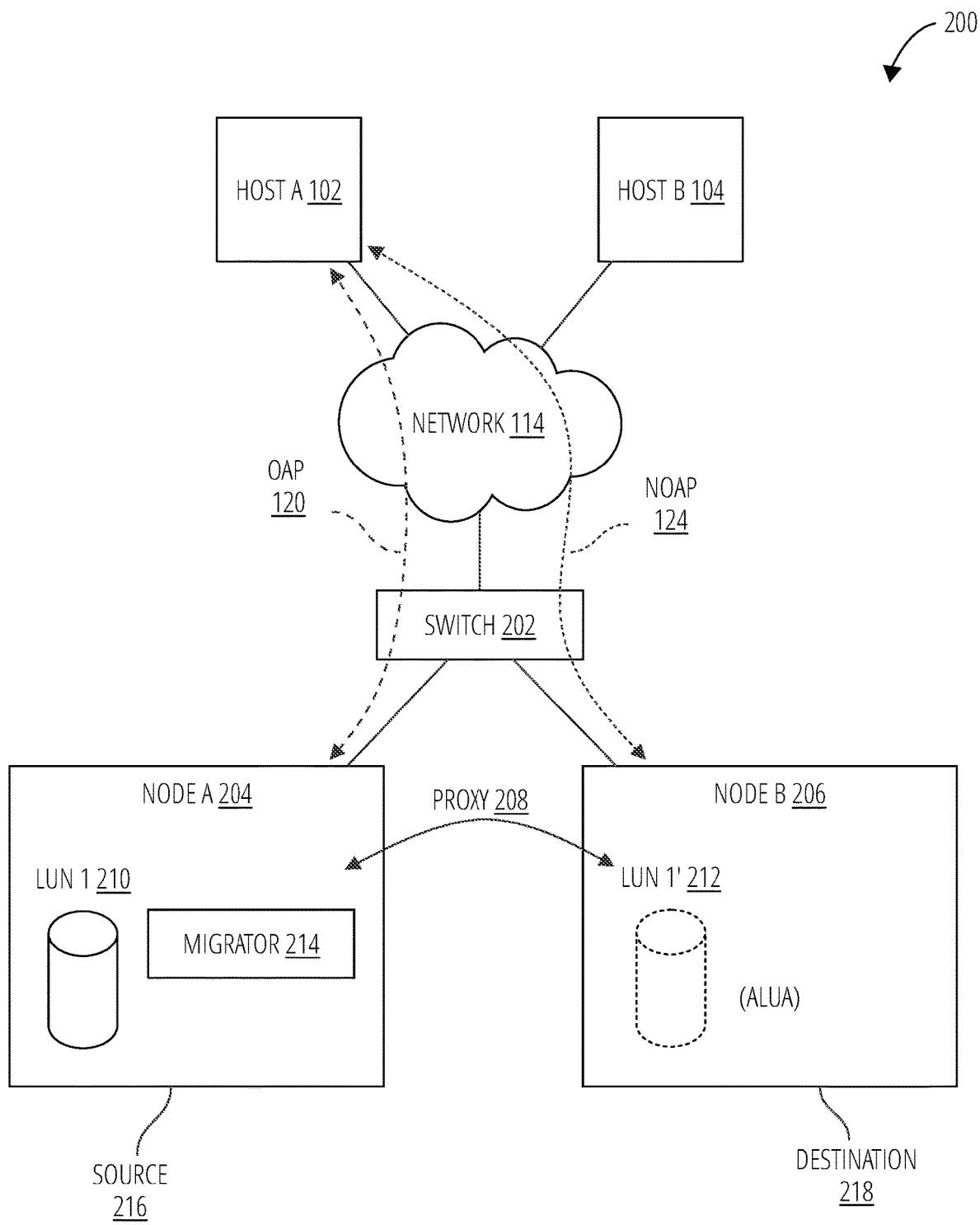
FIG. 2 illustrates a storage system 200 in accordance with one embodiment.

FIG. 2 illustrates a storage system 200 organized and configured to operate in an ALUA mode. Both nodes (node A 204 and node B 206) function differently to support an ALUA mode. The ALUA mode defines one node (e.g., node B 206) as the standby node. Node B 206 is designated the standby node based on how the paths to node B 206 (OA path or NOA path) are represented to the host.

The storage system 200 comprises a host A 102, a host B 104, a network 114, an OA path 120, a NOA path 124, a switch 202, a node A 204, a node B 206, a proxy communication channel 208, a LUN 1 210, a LUN 1' 212, and a migrator 214.

In a conventional storage system, ALUA mode requires that both the active node and the standby node maintain a data store of proxy port and PGR reservation information for each member of the storage system and keep this information updated and synchronized across the system as changes are made. This method of managing members of the storage system and support SCSI PGR commands includes overhead that is challenging to scale to larger systems.

Storage system 200 supports an ALUA mode configuration and supports SCSI PGR commands in compliance with the SCSI-3 specification, without the standby node having to manage the overhead of managing a data store of proxy port information, maintaining dual/copies of PGR reservation information, and keeping that information updated and synchronized.

Furthermore, storage system 200 provides a feature that enables the hosts (e.g., host A 102 and host B 104) to maintain constant access and use of storage resources (e.g., LUN 1 210, etc.) while one or more logical partitions (e.g., LUN 1 210) are migrated from a source node 216 node to a destination node 218. This feature, function, and capability, is referred to herein as a live data migration operation.

Storage system 200 is unlike a conventional storage system that supports ALUA mode because there is no single data store that node A 204 maintains, node B 206 is configured to service SCSI commands, node A 204 and node B 206 exchange information by way of proxy communication channel 208 such that the node B 206 services SCSI commands, including validating SCSI PGR commands, without having to reject the SCSI commands or only proxy them to the 204.

Storage system 200 includes a source node (e.g., node A 204) configured to service SCSI commands from a host, the source node being coupled to a first storage device (e.g., the storage device comprising LUN 1 210) that includes a logical partition (e.g., 210). The destination node (e.g., node B 206) is coupled to a second storage device and the destination node is configured to service SCSI commands from the host. The storage system 200 includes a communication channel (e.g., proxy communication channel 208) between the source node and the destination node.

The storage system 200 also includes a migrator (e.g., migrator 214) configured to migrate the logical partition from the source node to the destination node such that the host maintains storage operations with both the source node and the destination node during migration of the logical partition.

FIG. 2 illustrates a storage system 200 configured to support a live data migration operation that migrates LUN 1 210 to destination node 218 to continue service as LUN 1' 212. While data is being migrated from source node 216 to destination node 218, two copies of the data exist. Because the storage system 200 provides constant access to the LUN 1 210 during the migration, one of the two copies may be updated/changed and therefore be a valid copy of the data, while the other copy is not. The storage system 200 of the claimed solution manages this situation in a way that continues to provide only the valid data to the host(s) and completes the migration without the overhead of conventional ALUA mode implementations. In particular, node B 206 operates in the ALUA mode as a standby node. The standby node of node B 206 include logic that enables the standby node to selectively service SCSI commands locally or with the assistance of the active node based on where data associated with the SCSI command resides during a live data migration operation. In addition, the standby node of node B 206 include logic that enables the standby node to request PGR reservation data from the active node (e.g., node A 204) by way of the communication channel (e.g., proxy communication channel 208) to validate a SCSI PGR command at the standby node.

Persistent Group Reservations is a SCSI protocol that permits a host to gain exclusive, or shared with limitations, access to storage resources (e.g., LUN 1 210) over a specific access path. Exclusive access is obtained and maintained by way of a reservation system in which a host provides a key, a local port identifier, and a remote port identifier. The storage system 200 supports the SCSI PGR commands by using PGR reservation data stored and maintained by the active node (e.g., source node 216). PGR reservation data is a record of the current tuples that each include a host key, a local port identifier, and a remote port identifier. The PGR reservation data may be stored and maintained in a variety of data structures include a bitmap, a table, a database, a list, a file, or the like.

Figure 3:
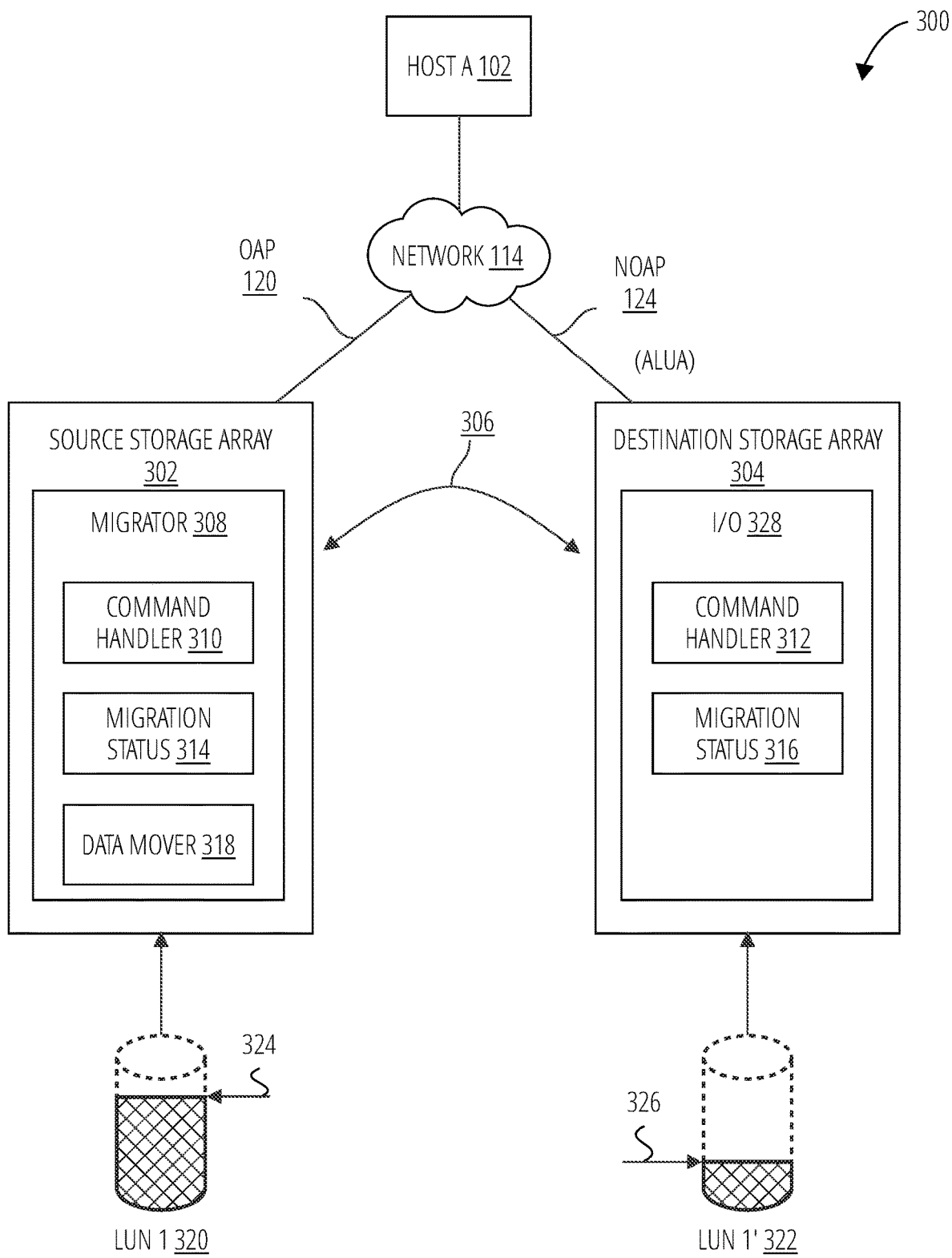
FIG. 3 illustrates a storage system 300 in accordance with one embodiment.

FIG. 3 illustrates a storage system 300 according to one embodiment, configured to support a live data migration operation. The storage system 300 comprises a host A 102, a network 114, an OA path 120, a NOA path 124, a source storage array 302, a destination storage array 304, a proxy communication channel 306, a migrator 308, a command handler 310, a command handler 312, a migration status module 314, a migration status module 316, a data mover 318, a LUN 1 320, a LUN 1' 322, a source progress pointer 324, a destination progress pointer 326, and an I/O module 328.

In storage system 300, a source node (e.g., source storage array 302) is configured to service SCSI commands from a host, the source node is coupled to a first storage device (e.g., LUN 1 320) that includes a logical partition (e.g., LUN 1 320). The storage system 300 includes a destination node (e.g., destination storage array 304) coupled to a second storage device, the destination node is configured to service SCSI commands from the host. The storage system 300 also includes a communication channel (e.g., proxy communication channel 306) between the source node and the destination node and a migrator (e.g., migrator 308) configured to migrate the logical partition from the source node to the destination node such that the host maintains storage operations with both the source node and the destination node during migration of the logical partition.

A user now wants to perform a live data migration operation and move LUN 1 320 from the storage device connected to source storage array 302 to a storage device connected to destination storage array 304, while the LUN 1 320, and data of LUN 1 320, continues to be accessible and used by host A 102. In one embodiment, the storage system 300 is operating in ALUA mode, with the source storage array 302 as the active node and the destination storage array 304 as the standby node, with established paths OA path 120 and NOA path 124.

In another embodiment, the storage system 300 is not operating in ALUA mode when a live data migration operation is initiated. In such an embodiment, the migrator 308 is configured to direct the source storage array 302 and the destination storage array 304 to each operate in Asymmetric Logic Unit Access (ALUA) mode and to convert an access path from the source storage array 302 to the host A 102 into an optimized access (OA) path (OA path 120) and to convert an access path from the destination storage array 304 to the host A 102 into a non-optimized access (NOA) path (NOA path 124). The migrator 308 is configured to migrate the logical partition (e.g., LUN 1 320) from the source storage array 302 to the destination storage array 304 while the source storage array 302 and destination storage array 304 each service SCSI commands received from the host A 102.

In one embodiment, once the storage system 300 is operating in ALUA mode, the migrator 308 directs the source storage array 302 to operate as an active node and directs the destination storage array 304 to operate as a standby node during a transition phase of the live data migration operation. In one embodiment, a live data migration operation includes multiple phases including a transition phase and a completion phase. In the transition phase, the migrator 308 migrates the LUN 1 320 to the destination storage array 304. FIG. 3 illustrates the storage system 300 during part of the transition phase. In particular, source progress pointer 324 indicates the progress of the data transfer (or copy) of data blocks from source storage array 302 to destination storage array 304. Source progress pointer 324 may start at the top of the LUN 1 320 and progressively move to the bottom of the LUN 1 320. Similarly, destination progress pointer 326 indicates the progress of the data transfer (or copy) of data blocks to destination storage array 304 from source storage array 302. Destination progress pointer 326 may start at the bottom of the LUN 1' 322 and progressively move to the top of the LUN 1' 322. Those of skill in the art appreciate that source progress pointer 324 and destination progress pointer 326 are for illustration, and that the LUN 1 320 migration may be done in a variety of orders and sequences, including the LUN 1 320 and LUN 1' 322 both moving from the start of the LUN 1 320 to the end or from the end to the start.

The storage system 300 provides constant, uninterrupted access to LUN 1 320 by way of the migration status module 314 on the source storage array 302 and migration status module 316 on the destination storage array 304. The migration status module 314 and migration status module 316 are configured to service SCSI commands, including SCSI PGR commands based on where the data blocks referenced in the SCSI command reside during the transition phase, and more specifically where the current valid version of data blocks referenced in the SCSI command reside during the transition phase. In one embodiment, the migration status module 314 and migration status module 316 manage SCSI commands based on location of the referenced data block during the transition phase by using a migration status module 314 on source storage array 302 and a migration status module 316 on destination storage array 304.

During the transition phase, the data mover 318 issues storage commands (read commands and write commands) to either move, or copy, data blocks (identified by LBAs) from LUN 1 320 to LUN 1' 322. In one embodiment, the migrator 308 migrates the LUN 1 320 by configuring the source storage array 302 as a SCSI initiator and configuring the destination storage array 304 as a SCSI target for SCSI write commands for data from the LUN 1 320 coupled to the source storage array 302 to a logical target partition (e.g., LUN 1' 322) coupled to the destination storage array 304. The source storage array 302 and destination storage array 304 are configured to exchange SCSI commands over the proxy communication channel 306 in order to migrate the LUN 1 320 to the destination storage array 304. In one embodiment, the source storage array 302 and destination storage array 304 exchange SCSI commands over the network 114. In another embodiment, the source storage array 302 and destination storage array 304 exchange SCSI commands over a direct wired connection or a private network that connects source storage array 302 to destination storage array 304.

Figure 4:
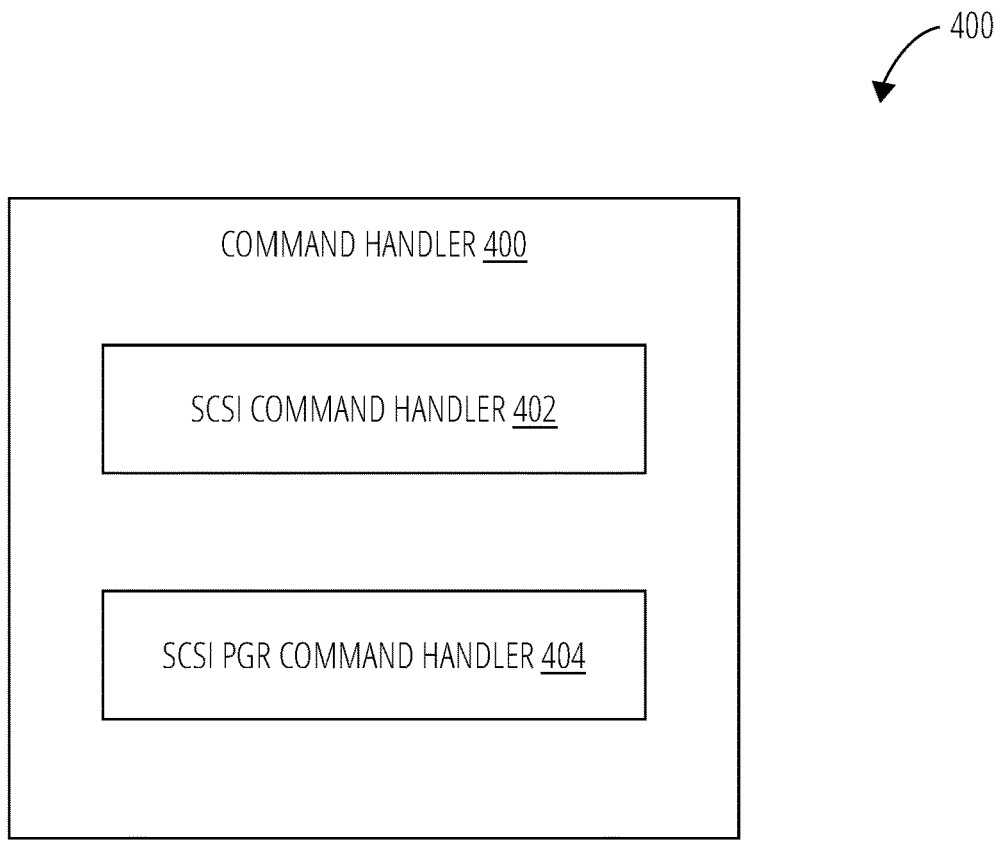
FIG. 4 illustrates a command handler 400 in accordance with one embodiment.

FIG. 4 illustrates one example of a command handler 400 suitable for use with different embodiments of storage system 200 and storage system 300. The command handler 400 may serve as a command handler 310 in source storage array 302 or as command handler 312 in destination storage array 304 during a live data migration operation. When the command handler 400 operates on the source storage array 302 and the source storage array 302 is an active node, the command handler 400 may be referred to as an active command handler. When the command handler 400 operates on the destination storage array 304 and the destination storage array 304 is a standby node, the command handler 400 may be referred to as a standby command handler.

The command handler 400 comprises a SCSI command handler 402, and a SCSI PGR command handler 404 which enable the command handler 400 to service SCSI commands received from the host A 102 during a live data migration operation. Reference is made to FIG. 3 and FIG. 4.

In one embodiment, the command handler 400 operates as an active command handler and is configured to selectively service SCSI commands at the active controller locally and/or proxy SCSI commands to the destination storage array 304 (standby node) to engage the assistance of the destination storage array 304 (standby node) depending on where data associated with the SCSI command resides during the live data migration operation.

In one embodiment, the command handler 400 operates as a standby command handler and is configured to selectively service SCSI commands at the destination storage array 304 (standby node) locally and/or proxy SCSI commands to the source storage array 302 (active node) to engage the assistance of the source storage array 302 (active node) depending on where (e.g., active node/source node or standby node/destination node) data associated with the SCSI command resides during the live data migration operation.

In one embodiment, the command handler 400 operates as a standby command handler and is configured to selectively service SCSI commands locally and with the assistance of the source storage array 302 (active node) based on where data associated with the SCSI command resides during a live data migration operation.

In one embodiment, the command handler 400 operates as a standby command handler and includes a SCSI command handler 402 configured to service SCSI commands and a SCSI PGR command handler 404 configured to validate SCSI PGR commands and within the command handler 400.

In one embodiment, the command handler 400 operates as a standby command handler and the SCSI PGR command handler 404 is configured to request PGR reservation data from the source storage array 302 (active node) by way of the proxy communication channel 306 to validate a SCSI PGR command at the destination storage array 304 (standby node). The SCSI PGR command handler 404 validates SCSI PGR commands by comparing the host key, local port identifier, and remote port identifier provided by the host in the SCSI PGR command with the PGR reservation data to determine if there is a matching host key, local port identifier, and remote port identifier. If a match is found, then the SCSI PGR command is validated and the SCSI PGR command is fulfilled for the host on the access path designated. If a match is not found, then the SCSI PGR command is not validated and the SCSI PGR command is rejected with a suitable response, such as an error message.

As used herein, locally means that the operation is performed or serviced within the same storage device, storage unit, storage controller, or storage array and responsibility for servicing and responding to a command is not transferred to a different storage device, storage unit, storage controller, or storage array.

In one embodiment, the command handler 400 operates as a standby command handler and the SCSI PGR command handler 404 is configured to request PGR reservation data by sending a modified command descriptor block (MCDB) message to the source storage array 302 (active node), the MCDB message configured to request the PGR reservation data and the source storage array 302 (active node) configured to respond to the MCDB message by sending the PGR reservation data to the destination storage array 304 (standby node).

In one embodiment, the command handler 400 operates as a standby command handler and the command handler 400 is configured to exchange one or more command descriptor block (CDB) messages with the source storage array 302 (active node) over of the proxy communication channel 306 to manage changes to PGR reservation data and service SCSI commands received from host A 102.

In one embodiment, the SCSI command handler 402 is configured to service SCSI commands by modifying a CDB message received from the host A 102 to form a modified command descriptor block (MCDB) message that includes content of the CDB message and proxy the MCDB message to the source storage array 302 (active node). The source storage array 302 (active node) is configured to service (all or a portion of) the SCSI command of the CDB message at the source storage array 302 (active node) and send results to the destination storage array 304 (standby node).

Referring now back to FIG. 3, the migrator 308 manages the command handler 310 and may instruct command handler 312 regarding how to handle commands during the live data migration operation. In one embodiment, during live data migration operation, the migrator 308 directs the source storage array 302 (active node) to service SCSI PGR commands received on the OA path 120 at the source storage array 302 (active node) and directs the destination storage array 304 (standby node) to service SCSI PGR command received on the NOA path 124 at the destination storage array 304 (standby node) by communicating directly with the source storage array 302 (active node) to retrieve PGR reservation data for PGR validation on the destination storage array 304 (standby node). SCSI PGR commands are a subset of SCSI commands.

Referring now back to FIG. 3, the migrator 308 maintains a migration status by way of a migration status module 314 configured to track which data blocks (by way of their logical block addresses) of LUN 1 320/LUN 1' 322 reside on the source storage array 302 (active node) and which data blocks (by way of their logical block addresses) of the LUN 1 320/LUN 1' 322 reside on the destination storage array 304 (standby node). In one embodiment, the migrator 308 may also maintain the migration status by way of a migration status module 316 operating on the destination storage array 304 (standby node). In another embodiment, the I/O module 328 may maintain the migration status by way of a migration status module 316 operating on the destination storage array 304 (standby node). In certain embodiments, the destination storage array 304 may include a migrator in place of, or together with, an I/O module 328. The migrator of the destination storage array 304 may be configured to cooperate with the migrator 308 to implement a live data migration operation.

FIG. 5 illustrates one example of how the migration status module 314 and/or migration status module 316 may track the status of each logical block address (and its associated data block) during the live data migration operation. The status being tracked is where (e.g., source node or destination node) the current, most up-to-date version of a data block that is being migrated. In the illustrated embodiment, the migration status module (314, 316) may use a logical address migration table 502. The logical address migration table 502 may include a row for each LBA (which is uniquely associated with each data block of the LUN 1 320/LUN 1' 322) and a column for the source storage array 302 (active node) and for the destination storage array 304 (standby node). A "1" in the column and row intersection means that the current, most up-to-date version of a data block is in the location indicated by the column (source or destination). A "0" in the column and row intersection means that the current, most up-to-date version of a data block is not in the location indicated by the column (source or destination). The migration status module (314, 316) may change the values on the row once an acknowledgement is received from the other node (source node/destination node) that the data block is safely stored. In this manner, the migrator 308 and/or command handler 310 and/or command handler 312 may determine how to service SCSI commands received at the respective active node or standby node during a transition phase of a live data migration operation.

Figure 6:
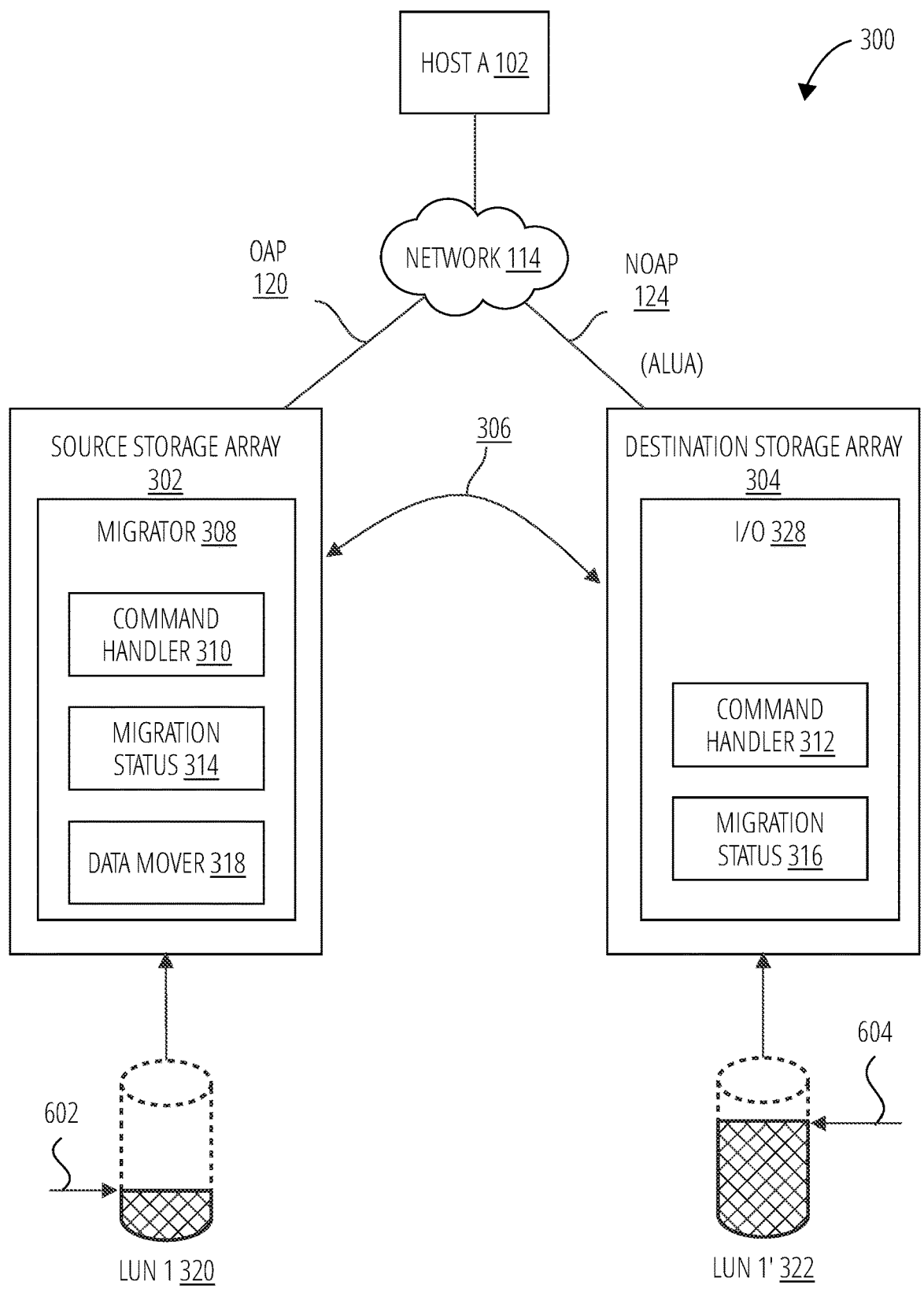
FIG. 6 illustrates a storage system 300 in accordance with one embodiment.

FIG. 6 illustrates the storage system 300 of FIG. 3 later in the transition phase, as the transition phase is completing the live data migration operation initiated prior to the state illustrated in FIG. 3. The storage system 300 comprises a host A 102, a network 114, a source storage array 302, a destination storage array 304, a proxy communication channel 306, a migrator 308, a command handler 310, a command handler 312, a migration status module 314, a migration status module 316, a data mover 318, a LUN 1 320, a LUN 1' 322, and an I/O module 328, as those components were described in relation to FIG. 3.

FIG. 6 also illustrates a source progress pointer 602, and a destination progress pointer 604 that indicate the progress of the data migration. Destination progress pointer 604 indicates the progress of the data transfer (or copy) of data blocks from source storage array 302 to destination storage array 304. Destination progress pointer 604 is nearing the top of the LUN 1' 322. Similarly, source progress pointer 602 indicates the progress of the data transfer (or copy) of data blocks to destination storage array 304 from source storage array 302. Source progress pointer 602 is nearing the bottom of the LUN 1 320.

In certain embodiments, during the transition phase, the source storage array 302 and destination storage array 304 are each servicing SCSI commands from host A 102. In certain embodiments, other components of the source storage array 302 and destination storage array 304 perform the required communications and accesses to the data resources to service the SCSI commands. As part of servicing the SCSI commands, including SCSI PGR commands, the source storage array 302 and destination storage array 304 may engage the migrator 308 to ensure that the SCSI commands are serviced using the most current and appropriate data block during the live data migration operation. In this manner, the host A 102 is uninterrupted in its use of, and access to, LUN 1 320 or data blocks of LUN 1 320 that have migrated to LUN 1' 322. As also illustrated in FIG. 6, the source storage array 302 maintains an OA path 120 with the host A 102 and the destination storage array 304 maintains a NOA path 124 with the host A 102.

Figure 7:
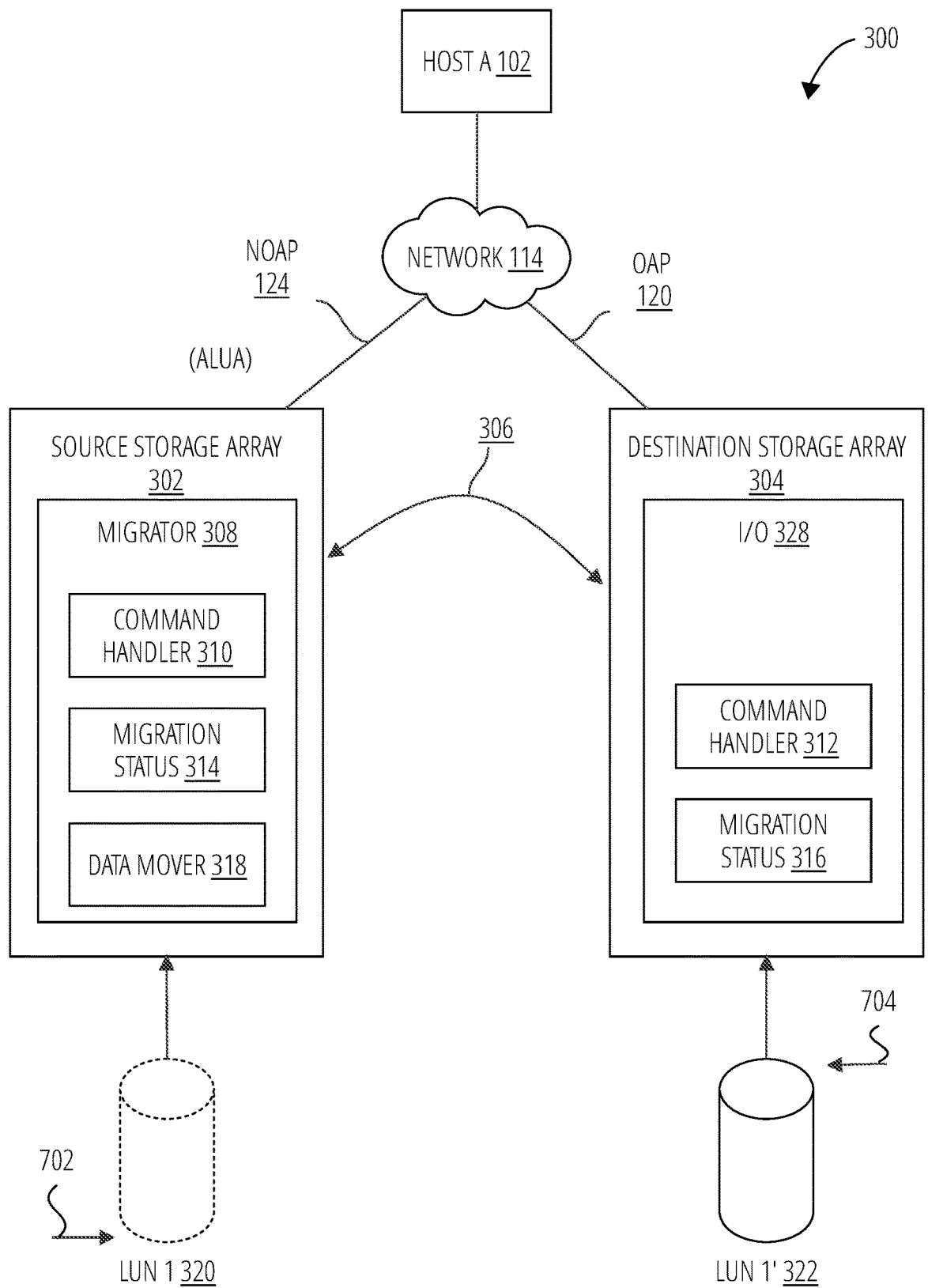
FIG. 7 illustrates a storage system 300 in accordance with one embodiment.

FIG. 7 illustrates the storage system 300 of FIG. 6 in the completion phase of the live data migration operation. In the completion phase of a live data migration operation, the data blocks of LUN 1 320 (a source node/storage resource) are successfully migrated to the destination storage array 304 (destination node/storage resource). Successful migration of LUN 1 320 to LUN 1' 322 is indicated by source progress pointer 702 and destination progress pointer 704 each reaching their respective ends of the LUN 1 320/LUN 1' 322. Successful migration of LUN 1 320 to LUN 1' 322 is also indicated by the solid outline of LUN 1' 322 versus the dotted outline of LUN 1 320.

In one embodiment, upon successful migration of one or more logical partitions (e.g., LUN 1 320), the migrator is configured to direct the source node (e.g., source storage array 302) to operate as a standby node during the completion phase and to direct the destination node (e.g., destination storage array 304) to operate as an active node. In certain embodiments, this means that source storage array 302 may change the configuration of its access path to host A 102 from an optimized access (OA) path (OA path 120) to a non-optimized access (NOA) path (NOA path 124). Similarly, this also means that destination storage array 304 may change the configuration of its access path to host A 102 from a non-optimized access (NOA) path (NOA path 124) to an optimized access (OA) path (OA path 120). In this manner, storage system 300 supports live data migration operation while providing constant, uninterrupted access to data blocks of the logical partition(s) being migrated.

Those of skill in the art appreciate that a live data migration operation may involve one or more logical partitions. The live data migration operation may not complete until all logical partitions are successfully migrated to the destination node.

FIG. 8 illustrates an example of a command descriptor block 800. The command descriptor block 800 includes an operation code 802 (opcode), a logical block address 804, a transfer length 806, and other fields defined by the SCSI specification. In certain embodiments, the storage system 300 supports a SCSI storage protocol that uses 16 byte command descriptor blocks, referred to herein as command descriptor block (CDB) messages. The CDB messages identify and provide the details for the SCSI command being requested by a host. Command descriptor block 800 illustrates an example CDB message for a SCSI read command of one byte at address 00000100.

The command descriptor block 800 includes an operation code 802 in byte 0 of the CDB message. The operation code defines the type of SCSI command that is to be performed. The logical block address 804 identifies the first LBA, starting LBA upon which to perform the operation and the transfer length 806 identifies how many data blocks (LBAs) are involved in the SCSI command. Of course, not all SCSI commands will designate a logical block address 804 and/or transfer length 806, depending on the nature of the SCSI command.

According to certain embodiments, of the claimed solution, the command handler 400 is configured to both leverage the existing CDB messages passed when the storage system 300 is configured in an ALUA mode and/or create new CDB messages to facilitate communications over the proxy communication channel 306 between a source node and a destination node during a live data migration operation.

Referring now to FIG. 8 and FIG. 4, use of CDB messages is explained. For example, in one embodiment, the SCSI PGR command handler 404 is configured to request PGR reservation data by sending a modified command descriptor block (MCDB) message to the active node/source node (e.g., source storage array 302). The MCDB message is configured to request the PGR reservation data and the active node/source node (e.g., source storage array 302) is configured to respond to the MCDB message by sending the PGR reservation data to the standby node/destination node (e.g., destination storage array 304).

In one embodiment, a modified command descriptor block (MCDB) message is a command descriptor block (CDB) message received from a host that the command handler 400 modifies and re-uses for purposes of supporting SCSI PGR commands (e.g., doing PGR validation) and for exchanging messages between a source node and a destination node during a live data migration operation, while servicing SCSI commands from a host.

In another embodiment, the SCSI PGR command handler 404 is configured to request PGR reservation data by sending a new command descriptor block 800 (CDB message) to the active node/source node (e.g., source storage array 302). The new CDB message is configured to request the PGR reservation data and the active node/source node (e.g., source storage array 302) is configured to respond to the CDB message by sending the PGR reservation data to the standby node/destination node (e.g., destination storage array 304).

In certain embodiments, the command handler 400 of a source storage array 302 (command handler 310) communicates a new CDB message and/or MCDB message to the command handler 400 of the destination storage array 304 (command handler 312) and vice versa.

FIG. 9 illustrates an example of a modified command descriptor block (MCDB) message 900 in accordance with one embodiment. The modified command descriptor block (MCDB) message 900 may comprise a vendor defined operation code 902, a logical block address 904, and a transfer length 906.

In one embodiment, the command handler 312 of the destination storage array 304 uses an MCDB message to service SCSI commands, including SCSI PGR commands. In one embodiment, a SCSI PGR command handler 404 is configured to request PGR reservation data by sending a modified command descriptor block (MCDB) message to the source storage array 302, the MCDB message is configured to request the PGR reservation data and the source storage array 302 is configured to respond to the MCDB message by sending the PGR reservation data to the SCSI PGR command handler 404.

In one embodiment, the command handler 312 of the destination storage array 304 uses an MCDB message to service SCSI commands. In one embodiment, the command handler 312 of the destination storage array 304 services SCSI commands by modifying a CDB message received from the host to form a modified command descriptor block (MCDB) message that includes content of the CDB message and proxy the MCDB message to the active node/source node (e.g., source storage array 302). The active node/source node (e.g., source storage array 302) is configured to service the SCSI command of the CDB message at the active node/source node (e.g., source storage array 302) and send results to the standby node/destination node (e.g., destination storage array 304).

In one embodiment, a command handler, including but not limited to, SCSI command handler, command handler 400, command handler 310, and command handler 312 may modify a CDB message to form an MCDB message by changing the opcode in the CDB message received from the host to a vendor defined operation code 902. A vendor defined operation code 902 is one or more opcodes that a communication standard such as SCSI provides as part of the standard. Manufacturers of storage devices compliant with the SCSI standard can use the vendor defined opcodes to implement particular parts of the standard.

In certain embodiments, the SCSI command handler (e.g., command handler 400, command handler 310, command handler 312) may form an MCDB message by changing an opcode of the CDB message to a vendor defined opcode (e.g., vendor defined operation code 902) that the active node/source node (e.g., source storage array 302) is configured to understand and configured to service. The MCDB message may include all of the same content, instructions, and codes (e.g., LBA, transfer length 906, etc.) of the original CDB message with the one change being the opcode (vendor defined operation code 902). Data associated with a CDB message or MCDB message may arrive in a subsequent communication message from the host.

Vendor defined operation code 902 is defined by each manufacturer and may take a variety of values. In one embodiment, the vendor defined operation code 902 is of the same size as the field for the opcode (e.g., operation code 802) as defined by the SCSI specification. Advantageously, the SCSI command handler on both the source node and destination node are configured to recognize, decode, and understand the vendor defined operation code 902. Use of a vendor defined operation code 902 and MCDB message leverages the existing logic in both command handlers (active command handler and standby command handler) and storage resources (e.g. buffers and encoders and decoders) to enable the advantages of the claimed solution.

Figure 10:
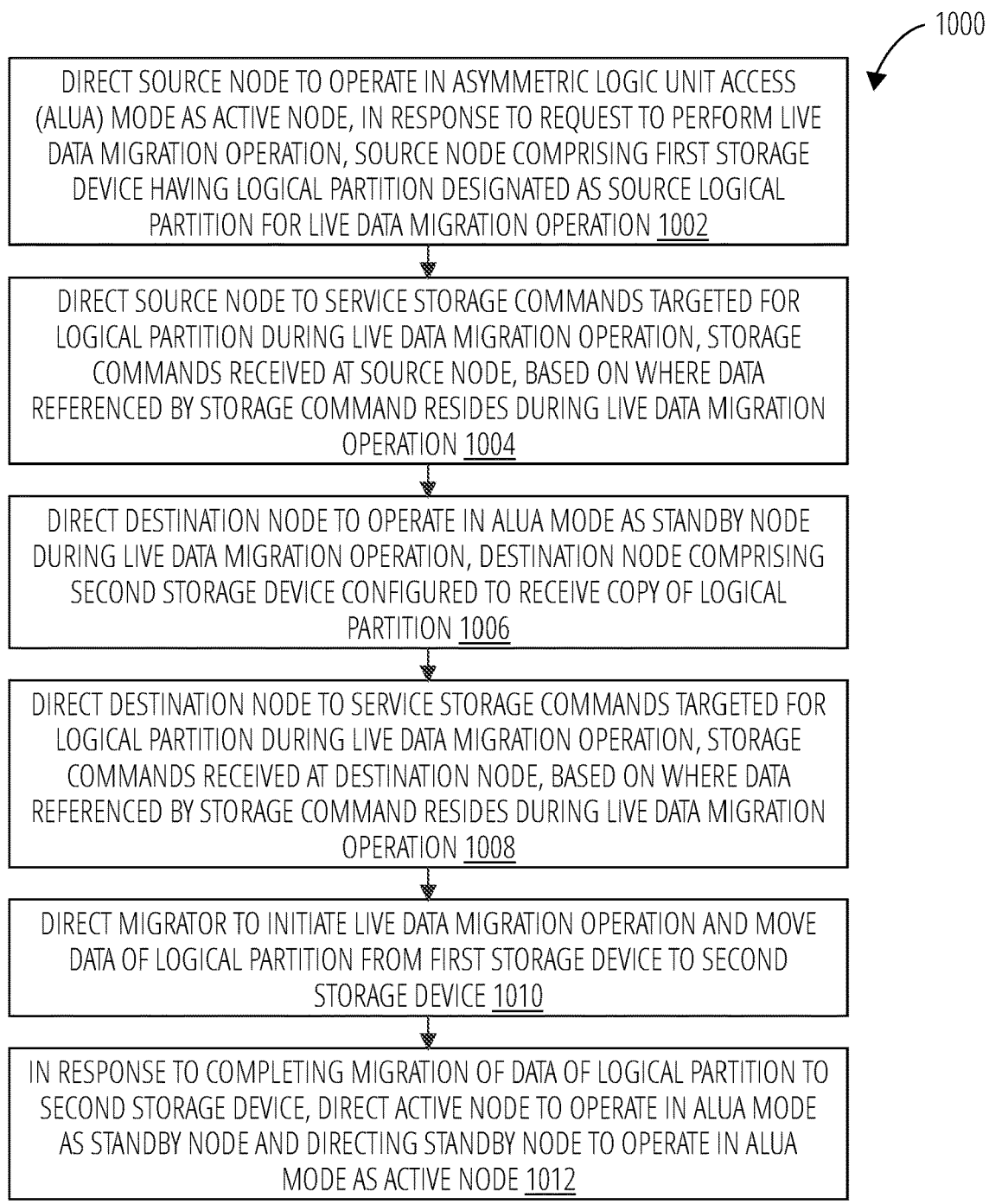
FIG. 10 illustrates a routine in accordance with one embodiment.

FIG. 10 illustrates a routine in accordance with one embodiment. In block 1002, routine 1000 directs a source node to operate in an Asymmetric Logic Unit Access (ALUA) mode as an active node, in response to a request to perform a live data migration operation, the source node comprising a first storage device having a logical partition designated as a source logical partition for the live data migration operation. In block 1004, routine 1000 directs the source node to service storage commands targeted for the logical partition during the live data migration operation, the storage commands received at the source node, based on where data referenced by the storage command resides during the live data migration operation. In block 1006, routine 1000 directs a destination node to operate in ALUA mode as a standby node during the live data migration operation, the destination node comprising a second storage device configured to receive a copy of the logical partition. In block 1008, routine 1000 directs the destination node to service storage commands targeted for the logical partition during the live data migration operation, the storage commands received at the destination node, based on where data referenced by the storage command resides during the live data migration operation. In block 1010, routine 1000 directs a migrator to initiate the live data migration operation and move data of the logical partition from the first storage device to the second storage device. In block 1012, routine 1000 in response to completing migration of data of the logical partition to the second storage device, directs the active node to operate in ALUA mode as a standby node and directing the standby node to operate in ALUA mode as an active node.

In one embodiment, a system is provided that supports live data migration. The system, in one embodiment, includes a means for directing a source node to operate in an Asymmetric Logic Unit Access (ALUA) mode as an active node, in response to a request to perform a live data migration operation, the source node comprising a first storage device having a logical partition designated as a source logical partition for the live data migration operation. The means for directing the source node, in various embodiments, is found in migrator 210, source storage array 302, migrator 308, or command handler 310. In certain embodiments, the system may include a means for directing the source node to service storage commands targeted for the logical partition during the live data migration operation, the storage commands received at the source node, based on where data referenced by the storage command resides during the live data migration operation. The means for directing the source node to service storage commands may be different from or the same means as the means for directing a source node to operate in an Asymmetric Logic Unit Access (ALUA) mode as an active node. The means for directing the source node to service storage commands targeted for the logical partition during the live data migration operation, in various embodiments, is found in migrator 210, source storage array 302, migrator 308, or command handler 310.

The system, in one embodiment, includes a means for directing a destination node to operate in ALUA mode as a standby node during the live data migration operation. The means for directing the destination node, in various embodiments, is found in migrator 210, source storage array 302, migrator 308, command handler 310, command handler 312, or I/O module 328. In certain embodiments, the system may include a means for directing the destination node to service storage commands targeted for the logical partition during the live data migration operation, the storage commands received at the destination node, based on where data referenced by the storage command resides during the live data migration operation. The means for directing the destination node to service storage commands may be different from or the same means as the means for directing the destination node to operate in an Asymmetric Logic Unit Access (ALUA) mode as a standby node. The means for directing the destination node to service storage commands targeted for the logical partition during the live data migration operation, in various embodiments, is found in migrator 210, source storage array 302, migrator 308, command handler 310, command handler 312, or I/O module 328.

The system, in one embodiment, includes a means for directing a migrator to initiate the live data migration operation and move data of the logical partition from a first storage device to a second storage device. The means for directing the migrator, in various embodiments, is found in node A 204, source storage array 302, or host A 102. In one embodiment of the system, the means for directing the source node directs the active node to operate in ALUA mode as a standby node and directs the standby node to operate in ALUA mode as an active node. In another embodiment of the system, the means for directing the source node directs the active node to operate in ALUA mode as a standby node and the means for directing the destination node directs the standby node to operate in ALUA mode as an active node.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

What is claimed is:

1. An apparatus comprising:
    an active controller configured to:
        operate in an Asymmetric Logic Unit Access (ALUA) mode; and
        service Persistent Group Reservation (PGR) Small Computer System Interface (SCSI) commands over an optimized access (OA) path to a host;
    a standby controller configured to:
        operate in the ALUA mode; and
        service SCSI PGR commands over a non-optimized access (NOA) path to the host; and
    a communication channel between the active controller and the standby controller, the communication channel configured to communicatively couple the active controller and the standby controller such that the standby controller services SCSI PGR commands over the NOA path, wherein the active controller is further configured to proxy SCSI commands to the standby controller by way of the communication channel in response to the active controller and the standby controller engaging in a live data migration operation.

2. The apparatus of claim 1, wherein the standby controller comprises:
    a standby command handler comprising a SCSI PGR command handler configured to validate SCSI PGR commands; and
    a SCSI command handler configured to service SCSI commands within the standby controller.

3. The apparatus of claim 2, wherein the standby command handler is configured to selectively service SCSI commands locally and with the assistance of the active controller based on where data associated with the SCSI command resides during a live data migration operation.

4. The apparatus of claim 2, wherein the SCSI PGR command handler is further configured to request PGR reservation data from the active controller by way of the communication channel to validate a SCSI PGR command at the standby controller.

5. The apparatus of claim 4, wherein:
the SCSI PGR command handler is further configured to request PGR reservation data by sending a command descriptor block (CDB) message to the active controller;
the CDB message is configured to request the PGR reservation data; and
the active controller is further configured to respond to the CDB message by sending the PGR reservation data to the standby controller.

6. The apparatus of claim 2, wherein the standby command handler is configured to exchange one or more command descriptor block (CDB) messages with the active controller over the communication channel to manage changes to PGR reservation data and service SCSI commands received from the host.

7. The apparatus of claim 6, wherein:
the SCSI command handler is further configured to service SCSI commands by modifying a CDB message received from the host to form a modified command descriptor block (MCDB) message that includes content of the CDB message and proxy the MCDB message to the active controller; and
the active controller is further configured to service the SCSI command of the CDB message defined within the MCDB message at the active controller and send results to the standby controller.

8. The apparatus of claim 7, wherein the SCSI command handler is further configured to form the MCDB message by changing an opcode of the CDB message to a vendor defined opcode that the active controller is configured to understand and to service.

9. The apparatus of claim 1, wherein the active controller comprises an active command handler configured to selectively service SCSI commands at the active controller locally and proxy SCSI commands to the standby controller to engage the assistance of the standby controller based on where data associated with the SCSI command resides during a live data migration operation.

10. A method comprising:
servicing, by a source node coupled to a first storage device that includes a logical partition, Small Computer System Interface (SCSI) commands from a host, wherein the SCSI commands comprise SCSI Persistent Group Reservation (PGR) commands;
servicing, by a destination node coupled to a second storage device, SCSI commands from the host, wherein a communication channel connects the source node and the destination node;
migrating, by a migrator, the logical partition from the source node to the destination node such that the host maintains storage operations with both the source node and the destination node during migration of the logical partition;
directing the source node to service SCSI PGR commands received on an optimized access (OA) path at the source node; and
directing the destination node to service SCSI PGR commands received on a non-optimized access (NOA) path at the destination node by communication directly with the source node to retrieve PGR reservation data for PGR validation on the destination node.

11. The method of claim 10, further comprising:
directing the source node and the destination node to each operate in an Asymmetric Logic Unit Access (ALUA) mode;
converting an access path from the source node to the host into the OA path;
converting an access path from the destination node to the host into the NOA path; and
migrating the logical partition from the source node to the destination node while the source node and destination node each service SCSI commands received from the host.

12. The method of claim 11, further comprising:
directing the source node to operate as an active node during a transition phase that migrates the logical partition to the destination node; and
directing the destination node to operate as a standby node during the transition phase.

13. The method of claim 11, further comprising:
directing the source node to operate as a standby node during a completion phase; and
directing the destination node to operate as an active node during the completion phase, wherein the completion phase comprises successful migration of the logical partition to the destination node.

14. The method of claim 11, further comprising:
configuring the source node as a SCSI initiator;
configuring the destination node as a SCSI target for SCSI write commands for data from the logical partition coupled to the source node to a logical target partition coupled to the destination node; and
exchanging, between the source node and the destination node, SCSI commands over the communication channel to migrate the logical partition to the destination node.

15. The method of claim 11, further comprising maintaining a migration status configured to track which logical block addresses of the logical partition reside on the source node and which logical block addresses of the logical partition reside on the destination node.

16. A system comprising:
a means for directing a source node to operate in an Asymmetric Logic Unit Access (ALUA) mode as an active node, in response to a request to perform a live data migration operation, wherein the source node comprises a first storage device having a logical partition designated as a source logical partition for the live data migration operation;
a means for directing the source node to service storage commands targeted for the logical partition during the live data migration operation, wherein the source node is configured to selectively service the storage commands received at the source node locally, based on where data referenced by the storage command resides during the live data migration operation;
a means for directing a destination node to operate in ALUA mode as a standby node during the live data migration operation, wherein the destination node comprises a second storage device configured to receive a copy of the logical partition;
a means for directing the destination node to service storage commands targeted for the logical partition during the live data migration operation, wherein:
the destination node is configured to selectively service the storage commands received at the destination node locally, based on where data referenced by the storage command resides during the live data migration operation; and the source node is further configured to proxy storage commands to the destination node to engage assistance of the standby node to service the storage commands where data referenced by the storage command resides in the standby node; and a means for directing a migrator to initiate the live data migration operation and move data of the logical partition from the first storage device to the second storage device, wherein, in response to completing migration of data of the logical partition to the second storage device:

the means for directing the source node to operate in ALUA mode directs the active node to operate in ALUA mode as a standby node; and the means for directing the destination node to operate in ALUA mode directs the standby node to operate in ALUA mode as an active node.

17. The system of claim 16, wherein the source node and the destination node are each configured to:

service Small Computer System Interface (SCSI) Persistent Group Reservation (PGR) commands received during the live data migration operation;

service SCSI commands received during the live data migration operation; and access data for received SCSI commands on one of the source node and the destination node.

18. The system of claim 16, wherein the logical partition comprises:

a portion of the logical partition accessible exclusively to the source node; and a portion of the logical partition accessible exclusively to the destination node.

19. The method of claim 10, further comprising:

requesting PGR reservation data from the source node by way of the communication channel to validate a SCSI PGR command at the destination node.

20. The method of claim 12, further comprising:

proxying, from the source node and over the communication channel, storage commands to the destination node to service the storage commands where data referenced by the storage command resides in the standby node.

* * * * *